(12) United States Patent
Lee (10) Patent No.: US 11,648,893 B2
(45) Date of Patent: May 16, 2023

(54) SYSTEM, METHOD AND APPARATUS FOR CONFIGURABLE MULTI-PURPOSE INPUT CONTROLS FOR AN AUTOMOBILE

(71) Applicant: Toyota Motor Engineering & Manufacturing North America, Inc., Plano, TX (US)

(72) Inventor: Jae Seung Lee, Ann Arbor, MI (US)

(73) Assignee: Toyota Motor Engineering and Manufacturing North America, Inc., Plano, TX (US)

( * ) Notice: Subject to any disclaimer, the term of this patent is extended or adjusted under 35 U.S.C. 154(b) by 546 days.

(21) Appl. No.: 16/818,769

(22) Filed: Mar. 13, 2020

(65) Prior Publication Data
US 2021/0284085 A1 Sep. 16, 2021

(51) Int. Cl.
*B60R 16/00* (2006.01)
*B60R 11/02* (2006.01)
*B60K 37/06* (2006.01)
*B60R 11/00* (2006.01)

(52) U.S. Cl.
CPC ............ *B60R 16/005* (2013.01); *B60K 37/06* (2013.01); *B60R 11/0229* (2013.01); *B60R 2011/001* (2013.01)

(58) Field of Classification Search
CPC ............... B60R 16/005; B60R 11/0229; B60R 2011/001; B60K 37/06
See application file for complete search history.

(56) References Cited

U.S. PATENT DOCUMENTS

| 9,587,958 | B2 | 3/2017 | Campbell et al. |
| 2003/0236596 | A1* | 12/2003 | Eisenmann ......... B60R 16/0315 701/1 |
| 2004/0119683 | A1 | 6/2004 | Warn et al. |
| 2010/0188248 | A1 | 7/2010 | Sultan et al. |
| 2014/0309806 | A1* | 10/2014 | Ricci ...................... G06Q 10/20 701/1 |
| 2019/0324542 | A1 | 10/2019 | Naboulsi |

FOREIGN PATENT DOCUMENTS

EP 1502835 A1 2/2005

* cited by examiner

*Primary Examiner* — Gertrude Arthur Jeanglaude
(74) *Attorney, Agent, or Firm* — Jordan IP Law, LLC (57) ABSTRACT

Methods, systems, and apparatuses may provide for technology to configure input control systems for an automobile. The technology may include one or more controllers to provide an input control signal for a function of an automobile, wherein each of the one or more controllers are to be situated at different locations that are accessible by a driver. The technology may also include a human machine interface to reconfigure a layout or function of at least one of the one or more controllers so that at least one of the one or more controllers is relocated to a different location or the at least one of the one or more controllers controls a different automobile function. Reconfiguring the location or function of the one or more controllers is to improve driver access, comfort and safety.

17 Claims, 7 Drawing Sheets

SYSTEM, METHOD AND APPARATUS FOR CONFIGURABLE MULTI-PURPOSE INPUT CONTROLS FOR AN AUTOMOBILE

TECHNICAL FIELD

Embodiments generally relate to input controls for an automobile. More particularly, embodiments relate to configurable multi-purpose input controls to reconfigure a layout or function of one or more driver input controllers are needed.

BACKGROUND

Modern automobiles have an ever-increasing number configurable multi-purpose input controls to reconfigure a layout or function of one or more driver input controllers of capabilities and functions. A plurality of input controllers is provided to allow a driver to control many of these capabilities and functions. Input controllers may be provided on or proximate the steering wheel or driver to control various safety functions, convenience functions, information and entertainment (i.e., infotainment) capabilities, and other optional features. Safety functions may include turn signals (i.e., turn indicators), head lights (i.e., ON/OFF, auto ON, fog/driving lights, high beam, low beam), and the like. Convenience functions may include side and rear view mirror adjustment controls, cruise control, steering wheel adjustment, and the like. Information and entertainment capabilities may include global positioning system (GPS) controls, radio/stereo controls, telephone controls, integrated technology controls such as advanced driver-assistance system (i.e., collision avoidance, lane departure warning, adaptive cruise control, and the like). The increased number of input controllers tends to clutter the steering wheel and require that the input controllers be made smaller. The input controllers are also often placed or situated in awkward positions for the driver. Further, because many of these features are located at static locations on one side of the steering wheel or steering column, drivers having strong hand dominance preferences or issues (e.g., left-handedness or right-handedness), or drivers with limited physical abilities may experience difficulty accessing these features. These factors may limit the driver's comfort and access to these features. As a result, driver satisfaction and overall safety of the automobile may be diminished.

Further still, automobiles are manufactured to comply with national directional driving standards such as right-hand traffic (RHT) and left-hand traffic (LHT). These standards mandate which side of the road an automobile must be driven on. In RHT countries, the automobile is configured to place the steering wheel on the left-side of the automobile, and the automobile must be driven on the right-side of the road (i.e., right-side drive). In LHT countries, the automobile is configured to place the steering wheel on the right-side of the automobile, and the automobile must be driven on the left-side of the road (i.e., left-side drive). These different configurations may present difficulties to drivers when driving an automobile having a different drive side configuration from which they are accustomed, or when driving in a country that mandates a different drive side configuration than they are accustomed. As a result, configurable multi-purpose input controls to reconfigure a layout or function of one or more driver input controllers are needed.

BRIEF SUMMARY

In one embodiment, the disclosure provides a configurable input control system for an automobile that includes a processor, a memory communicatively coupled to the processor, and one or more controllers to provide an input control signal for a function of an automobile, wherein each of the one or more controllers are to be situated at different locations. The system also includes an input controller subsystem, in communication with the processor and one or more controllers, to reconfigure a layout or function of at least one of the one or more controllers so that the at least one of the one or more controllers is relocated to a different location or the at least one of the one or more controllers controls a different automobile function.

In another embodiment, the disclosure provides a method of configuring input controls of an automobile including providing, via one or more controllers, an input control signal for a function of an automobile, wherein each of the one or more controllers are to be situated at different locations, and reconfiguring a layout or function of at least one of the one or more controllers so that the at least one of the one or more controllers is relocated to a different location or the at least one of the one or more controllers controls a different automobile function.

In yet another embodiment, the disclosure provides at least one computer readable storage medium comprising a set of instructions, when executed by a processor, cause the processor to provide, via one or more controllers, an input control signal for a function of an automobile, wherein each of the one or more controllers are to be situated at different locations, and reconfigure a layout or function of at least one of the one or more controllers so that the at least one of the one or more controllers is relocated to a different location or the at least one or the one or more controllers controls a different automobile function.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

FIGS. 3A-6 are examples of configurable multi-purpose input controllers according to an embodiment.

DETAILED DESCRIPTION

Figure 1:
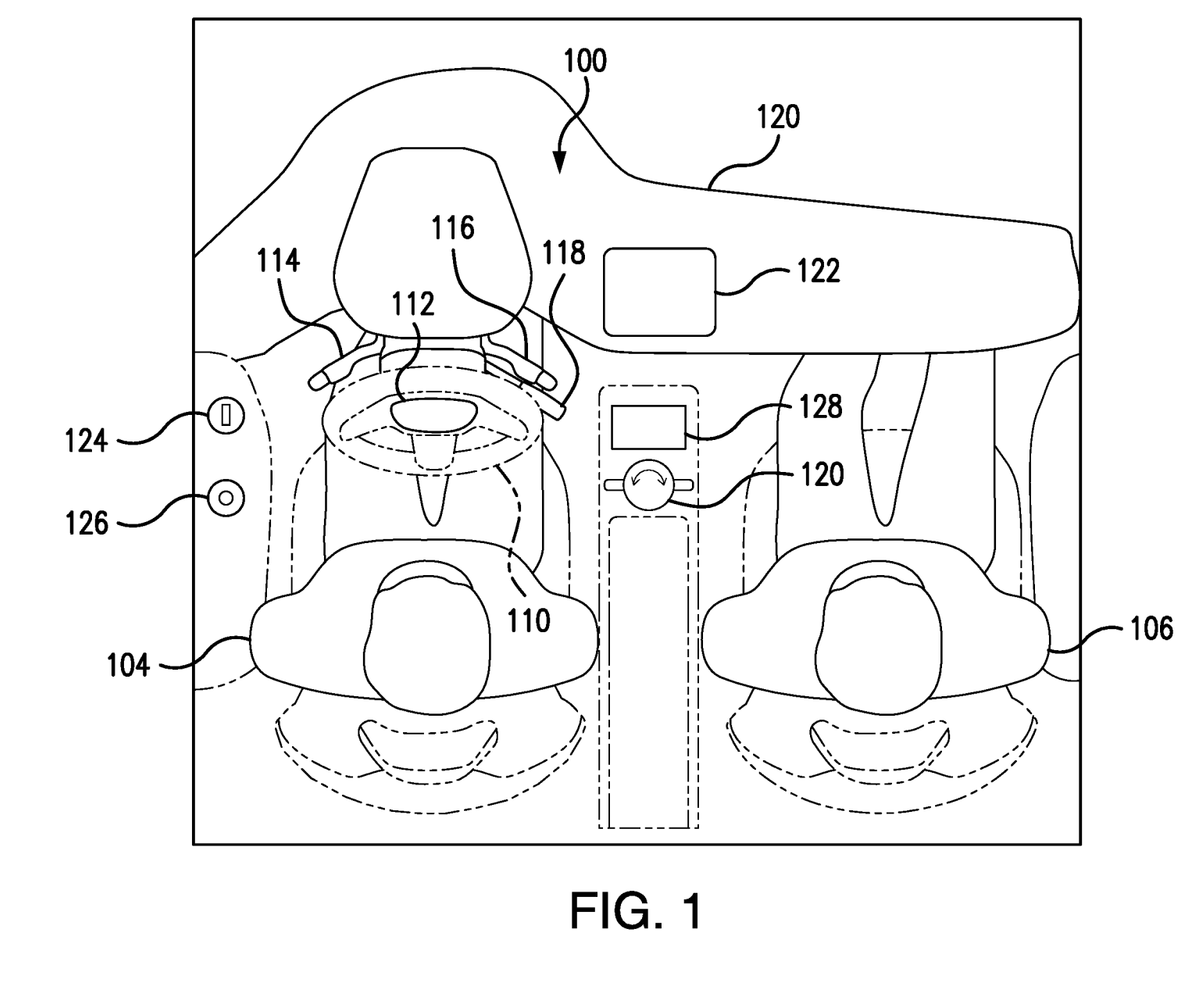
FIG. 1 is an overview of an example of a portion of a vehicle according to an embodiment.

Turning now to FIG. 1, shows a configurable multi-purpose input control system 100 implemented in a portion of a vehicle (e.g., car, truck, van, sport utility vehicle/SUV, etc.) 102. The vehicle 102 is depicted as being configured for right-hand traffic (RHT) having a steering wheel 110 attached to a steering column 112 on the left side, a seat for a driver 104 on the left side, and a seat for a passenger 106 on the right side.

The configurable multi-purpose input control system 100 includes a left-side steering column controller 114 (e.g., a turn signal controller, head lights controller, etc.), a right-side steering column controller 116, an auxiliary steering column controller (e.g., a windshield wiper controller, windshield washer controller, etc.), an auxiliary steering column controller (e.g., a cruise control controller, a speed controller, etc.), a center console controller 120 (e.g., a rotating knob selector, a mouse pad controller, etc.), a dash-mounted display controller 122 (e.g., a touchscreen, an input control screen, etc.), a door panel controllers 124, 126 (e.g., side view mirror controller, trailer mirror controller, etc.), and an electronic shifter controller 128. Although the illustrated input control system 100 includes controllers 114-128, embodiments are not limited therewith, and thus, may encompass additional controllers that fall within the spirit and scope of the principles of this disclosure set forth herein.

The multiple controllers allow the driver 104 to initiate inputs to the various controllers 114-128 to control various safety and convenience features of the vehicle. The controllers 114-128 may include, for example, a turn signal switch, a wiper control switch, a rear view mirror control switch, a trailer mirror control switch, a cruise control switch, a mouse pad controller, a rotating knob selector, a universal switch, and the like. Many additional controllers (not shown here) may also be located on or adjacent the steering wheel 110 and/or steering column 112 (e.g., radio, cruise control, telephone, hands free, transmission shifter, paddle shifters, steering wheel heater, steering wheel adjuster, etc.). Due to the increasingly high number of features and associated controllers located on or proximate the steering wheel and/or steering column, the available space for these controllers is often cluttered. Further, some drivers find that some of the controllers are often placed at dedicated, static, awkward, and inconvenient locations that inhibit the access to the controllers and/or the comfort of the driver. Further still, some drivers, such as those having physical limitations or disabilities (e.g., loss of limb(s), limited use of limb(s), injury to limb(s), etc.) or strong dominant hand preferences (i.e., weak right-handedness or weak left-handedness) may find it difficult to access and control some features due to the poor access and/or comfort. Based at least on the foregoing, reconfiguring the layout or function of one or more of the controllers to be located at a different location, or to control a different function, may improve driver access and comfort. As a result, overall safety may be improved.

Figure 2:
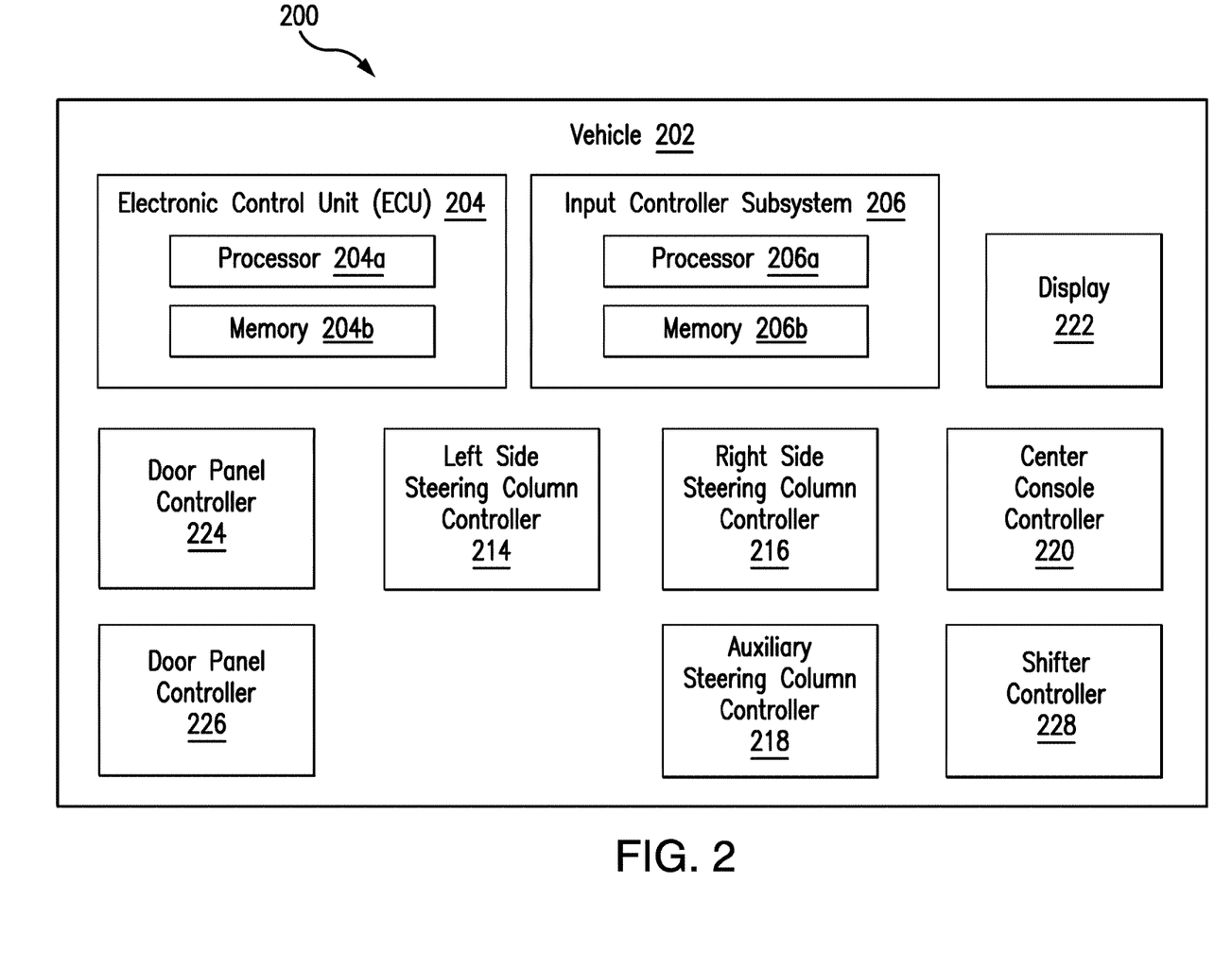
FIG. 2 is a block diagram of an example of a configurable multi-purpose input control system according to an embodiment.

FIG. 2 provides a block diagram of an example of a configurable multi-purpose input control system 200 implement in a vehicle 202 having an electronic control unit (ECU) 204. The illustrated configurable multi-purpose input control system 200 may be readily substituted for the configurable multi-purpose input control system 100, as discussed above with respect to FIG. 1. In the illustrated example, the system 200 includes an input controller subsystem 206, a left side steering column controller 214, a right side steering column controller 216, an auxiliary steering column controller 218, a center console controller 220, display 222, door panel controllers 224, 226, and a shifter controller 228. The various controllers 214-228 may be generally provided in locations similar to those of the embodiment shown in FIG. 1. The controllers 214-228 allow a driver to provide inputs to the input controller subsystem 206 and/or ECU 204. The inputs may be related to various safety and convenience related features of the vehicle 202, as discussed above with respect to FIG. 1. Each of the controllers 214-228 may be assigned one or more control functions. Although the illustrated input control system 200 includes controllers 214-228, embodiments are not limited therewith, and thus, may encompass additional controllers that fall within the spirit and scope of the principles of this disclosure set forth herein.

The ECU 204 (204a, 204b) includes a processor 204a (e.g., embedded controller, central processing unit/CPU) and a memory 204b (e.g., non-volatile memory/NVM and/or volatile memory) containing a set of instructions, which when executed by the processor 204a, cause the ECU 204 to control one or more functions of the system 200. The ECU 204 may receive input signals from controllers 214-228 and/or from the input controller subsystem 206. The input controller subsystem 206 (206a, 206b) includes a processor 206a (e.g., embedded controller, central processing unit/ CPU) and a memory 206b (e.g., non-volatile memory/NVM and/or volatile memory) containing a set of instructions, which when executed by the processor 206a, cause the input controller subsystem 206 to assign, control, or reassign one or more features, functions or locations related to the controllers 214-228. The assignment, control, or reassignment of the functions of controllers 214-228 may be performed via the input controller subsystem 206 by, for example, an electronic and/or a mechanical process as will be discussed further below. The input controller subsystem 206 may also reconfigure a layout or function of at least one of the controllers 214-228 so that the selected controller is located at a different location or controls a different function. As an example, the assigned control function(s) (and the location) for each of the controllers 214-228 may be stored (e.g., in a table, lookup, etc.) in a memory of input controller subsystem 206 and/or ECU 204, for example, as controller-control function pairings.

In at least some embodiments, the input controllers 214-228 have significant input capabilities and may be finely tuned to provide many different inputs as required by a particular implementation. Some examples of controllers suitable for use with at least one embodiment are discussed below with respect to FIGS. 3A-3F. Each of the controllers 214-228 may control at least two different functions such that one or more control features associated with the controller may be reassigned to a different input controller 214-228 by the input controller subsystem 206 (i.e., the controller-control function pairings may be changed or swapped). As an example, the controller-control function pairing of the left side steering column controller 214 (or 114) may be designated as the turn signal/head lights controller, and the controller-control function pairing of the right side steering column controller 216 (or 116) may be designated as the windshield wiper/washer controller. In at least some embodiments, the input controller subsystem 206 may reassign and/or swap the functions of the controllers 214-228 to different locations. Swapping the functions of the controllers 214-228 may include swapping the functions from one side of the driver to the other side to change a layout of at least one of the one or more controllers between a right-hand dominant layout and a left-hand dominant layout.

As an example, a driver may swap, via the input controller subsystem, the controller-control function pairings of the left side steering column controller 214 and the right side steering column controller 216 such that the left side steering column controller 214 controls the windshield wiper/ washer functions and the right side steering column controller 216 controls the turn signal/head lights functions. This process may be performed, for example, to reconfigure the controllers 214, 216 based on, for example, driver limitations, comfort or use such that a control function may be placed in a safer, more convenient or accessible location. For example, if the driver has limited use of her/his left hand, makes frequent turns, regularly drives at night on dimly lighted streets, and/or rarely encounters rain, they may choose to swap the functions of the controllers 214 and 216. Swapping the functions of the controllers 214 and 216 would include reassigning the turn signal/head lights function from the left side steering column controller 214 (i.e., the side with physical limitations) to the right side steering column controller 216 (i.e., the able handed side) in order to be more accessible to the driver, and reassign the windshield wiper/washer functions (which are rarely used) from the right side steering column controller 216 to the left side steering column controller 214. Similarly, if the driver has limited use of her/his right hand, frequently drives in rain and precipitation, but rarely makes turns or drives at night, they may choose to reassign the windshield wiper/washer function from the right side steering column controller 216 (i.e., the side with physical limitations) to the left side steering column controller 214 (i.e., the able handed side) in order to be more accessible to the driver, and reassign the turn signal/head lights function from left side steering column controller 214 to the right side steering column controller 216. While the foregoing is discussed with respect to the left side steering column controller 214 and left side steering column controller 216, other controllers may be used without departing from the spirit and scope of the principles of the disclosure set forth herein. For example, the functions of a center console controller (e.g., a mouse pad controller, knob controller, etc.) may be reassigned and/or swapped with the functions of a door panel controller (e.g., a mouse pad controller, knob controller, toggle controller, etc.) without departing from the spirit and scope of the principles of the disclosure set forth herein, as would be apparent to the skill practitioner based upon the disclosure.

Figure 3A:
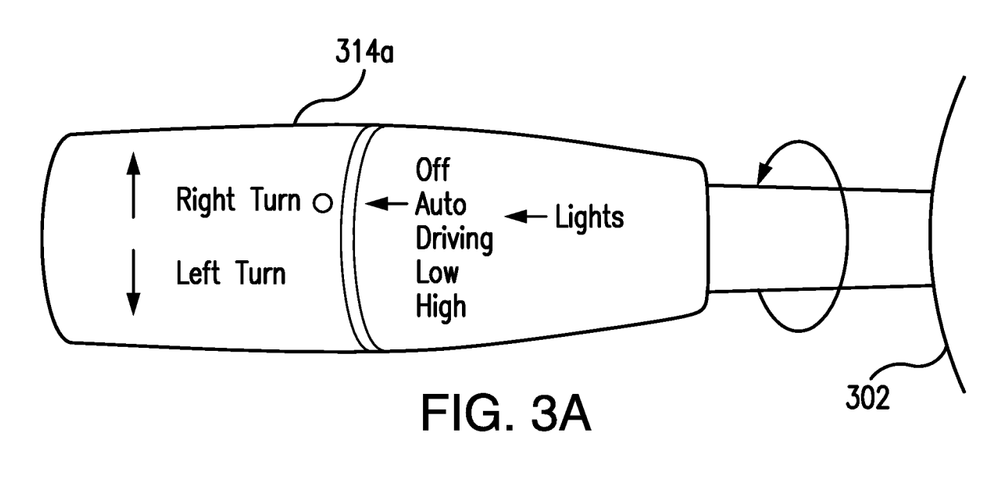

FIGS. 3A-6 illustrate examples of configurable multi-purpose input controllers suitable for use with the system 200. In at least some embodiments, the illustrated controllers may be readily substituted for the configurable multi-purpose input controllers 214-228, as discussed above with respect to FIG. 2. In at least some embodiments, the depicted functions may be backlit or illuminated to clearly identify the designated functions. FIG. 3A-3B illustrate embodiments of an example of a turn signal/head lights controller 314. FIG. 3A depicts the controller 314a as a standard left side steering column controller disposed on the left side of steering column 302, as discussed above with respect to FIGS. 1 and 2. The controller 314a includes depicted functions for Right Turn, Left Turn, and Head Light controls (including OFF, Auto ON, Driving, Low Beam and High Beam).

As illustrated, the end portion of the controller 314a rotates (e.g., in clockwise and counterclockwise directions) to control the head light functions. The controller 314a is to be manipulated by a user to pivot upwardly about a pivot axis to initiate a Right Turn signal, and manipulated by a user to pivot downwardly about the pivot axis to initiate a Left Turn signal. In at least some embodiments, the controller 314a may be rotated one-half revolution (e.g., in a clockwise direction) about the stem (see Arrow) to initiate, via the input controller subsystem 206, a reassignment of the functions associated with the controller and to reveal a back side of the controller 314a having a different set of functions which are to be assigned to the controller 314a. In at least one embodiment, for example, the back side of controller 314a includes a set of functions associated with a windshield wiper/washer function, as depicted in FIG. 4B. In this example, rotating the controller 314a (e.g., one-half revolution) would have the effect of reassigning the functions of the left side steering column controller 314 from a turn signal/head light function to a windshield wiper/washer function. This reassignment would have the effect of swapping the side of the steering column 302 on which the windshield wiper/washer function is located. The input controller subsystem 206 may require that the designated functions (i.e., the turn signal/head light functions) of the left side steering column 314a be reassigned to a different location before any changes take effect. The left side steering column controller 314a may also be rotated back to its original position (e.g., in a counterclockwise direction) to reassign the left side steering column controller 314a back to its original turn signal/head light function. A similar process may be performed to reassign functions associated with a right side steering column controller, as discussed below.

Figure 3B:
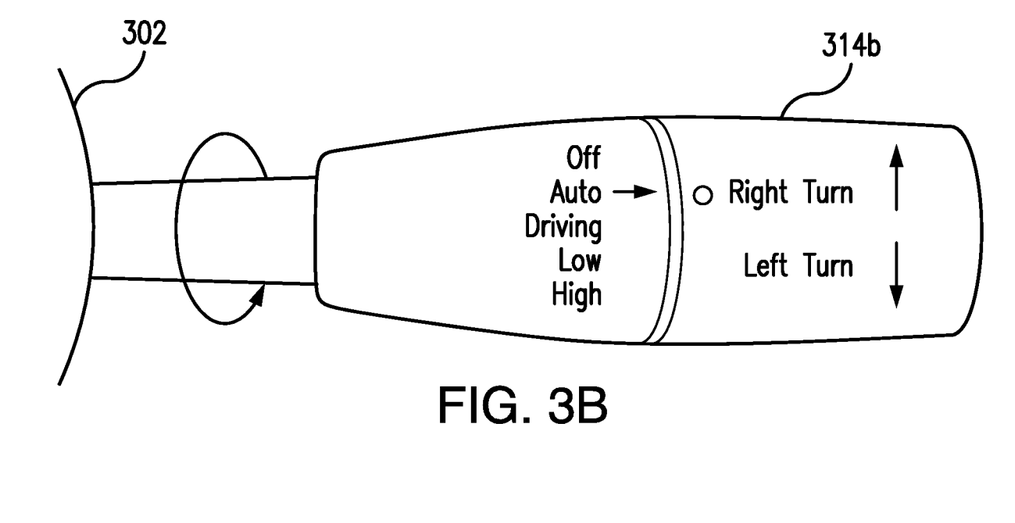

FIG. 3B depicts the controller 314b as a reassigned right side steering column controller. In at least some embodiments, the original functions associated with left side steering column controller 314a (FIG. 3A) located on the left side of steering column 302 may be reassigned and relocated to the right side steering column controller 314b located on the right side of steering column 302, following a similar process as discussed above with respect to FIG. 3A. Reassigning the functions depicted in FIG. 3A to the location depicted in FIG. 3B would confirm in the input controller subsystem 206 the reassignment of the turn signal/head light functions to a different location and ensure that all safety features are valid.

Figure 4A:
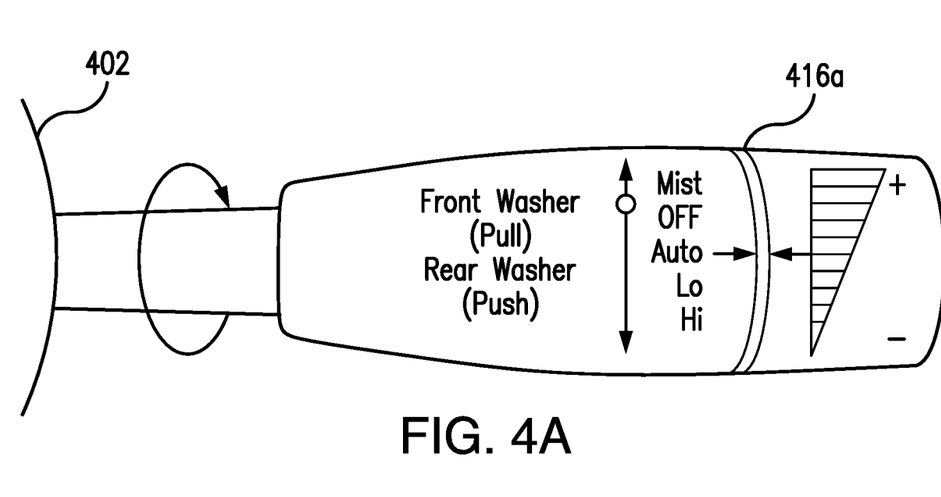
Figure 4B:
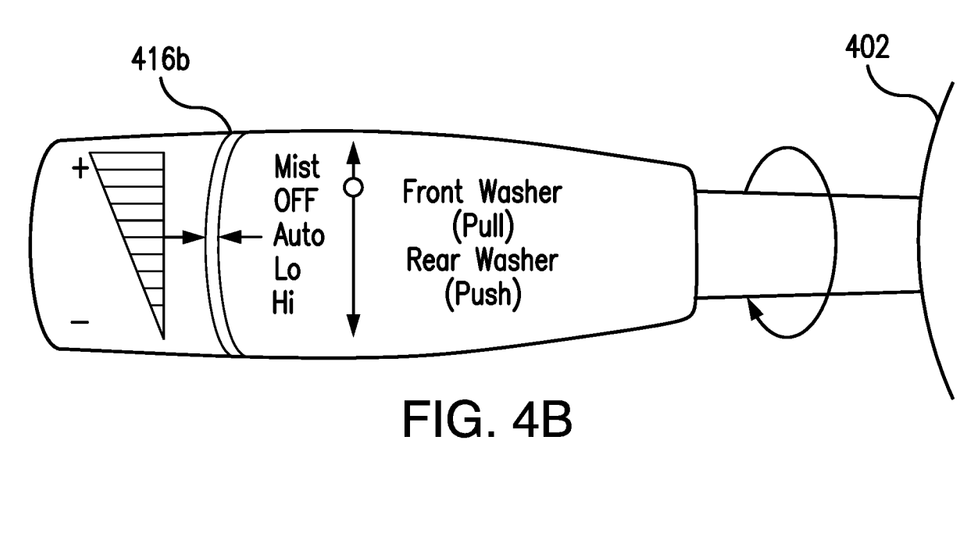

FIG. 4A-4B illustrate embodiments of an example of a windshield wiper/washer controller 416. FIG. 4A depicts the controller 416a as a standard right side steering column controller disposed on the right side of steering column 402, as discussed above with respect to FIGS. 1 and 2. The controller 416a includes depicted functions for Front Washer, Rear Washer, and Windshield Wiper controls (including Mist, OFF, Auto ON, Lo Speed, and High Speed). As illustrated, the end portion of the controller 416a rotates to control the wiper speed functions. The controller 416a is to be manipulated by a user to pivot upwardly about a pivot axis to initiate a Mist signal, manipulated by a user to pivot downwardly about the pivot axis to control the wiper speed functions, manipulated (e.g., pulled) by a user to move outwardly along a longitudinal axis of the controller 416a to control the front washer function, and manipulated (e.g., pushed) by a user to move inwardly along the longitudinal axis of the controller 416a to control an optional rear washer function. In at least some embodiments, the controller 416a may be rotated one-half revolution about the stem to initiate, via the input controller subsystem 206, a reassignment of the functions associated with the controller and to reveal a back side of the controller 416a having a different set of functions which are to be assigned to the controller 416a, as discussed above with respect to FIGS. 3A-3B.

In at least one embodiment, for example, the back side of controller 416a includes a set of functions associated with a turn signal/head lights function, as depicted in FIG. 3B. In this example, rotating the controller 416a (e.g., one-half revolution in a clockwise direction) would effectively reassign the functions of the right side steering column controller 416a from a windshield wiper/washer function to a turn signal/head light function. This reassignment would have effect of changing/swapping the side of the steering column 402 on which the windshield wiper/washer function is located. The input controller subsystem 206 may require that the designated functions (i.e., the windshield wiper/washer functions) of the right side steering column 416a be reassigned to a different location before any changes take effect. The right side steering column controller 416a may also be rotated back to its original position (e.g., in a counterclockwise direction) to reassign the right side steering column controller 416a back to its original windshield wiper/washer function. A similar process may be performed to reassign functions associated with a left side steering column controller.

Figure 5:
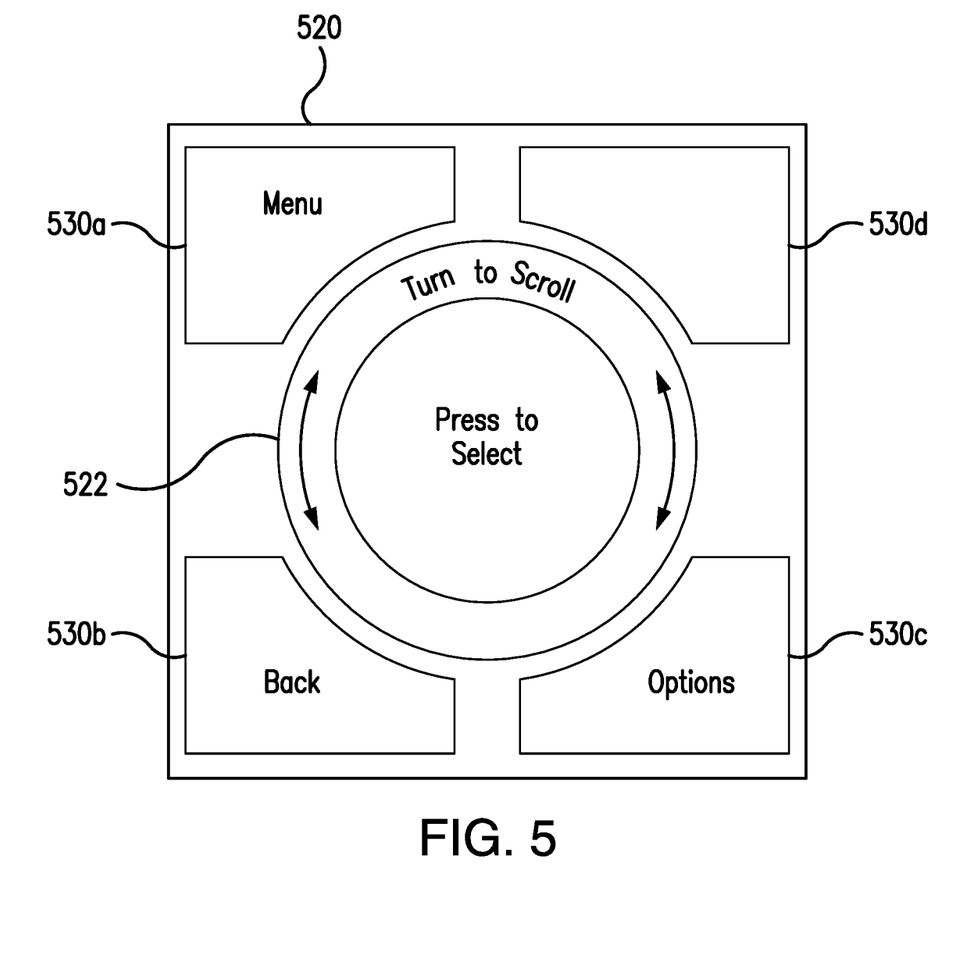

FIG. 5 depicts a controller 520 as a center console controller (e.g., a mouse pad controller), as discussed above with respect to FIGS. 1 and 2. The controller 520 may include a selector knob 522 and one or more additional selector buttons 530a-530d. The selector knob 522 may be, for example, a bidirectional scroll knob that rotates about a central axis to scroll through an associated menu (not shown here). The associated menu may be displayed in one or more locations including, for example, on display such as display 122 or 222. In at least some embodiments, the selector knob 522 may also be depressed to make input selections. The additional selector buttons 530a-530d may be "quick access" buttons that link directly to a designated selection. The menu button 530a may link directly to a menu. The back button 530b may link directly to the last menu page or selection. Options button 530c may link directly to an options menu. Button 530d may be assignable as a user option. In at least some embodiments, the center portion of selector knob 522 may be a touch sensitive mouse pad that also provides user input. As a result of the outlined features, the selector knob 522 and the additional selector buttons 530a-530d combine to provide the controller 520 with a wide range of input options. In at least some embodiments, the controller 520 including the input options and function controls provided by the selector knob 522 and additional controller may be flexibly reassigned by the input controller subsystem 206 to reconfigure a layout or function of at least one or more controllers to be relocated to the selector knob 522 or to control one or more different functions. For example, one or more functions of the center console controller 520 may be reassigned to a door panel controller 600, discussed below. Similarly, the functionality of the door panel controller 600 may be reassigned to the center console controller 520. A reassignment process similar to the process discussed above with respect to FIGS. 3A-4B may be used to reconfigure a layout or function of the controllers so that the door panel controller 600 are relocated to the center console controller 520 and the functions of the center console controller 520 are relocated to the door panel controller 600.

Figure 6:
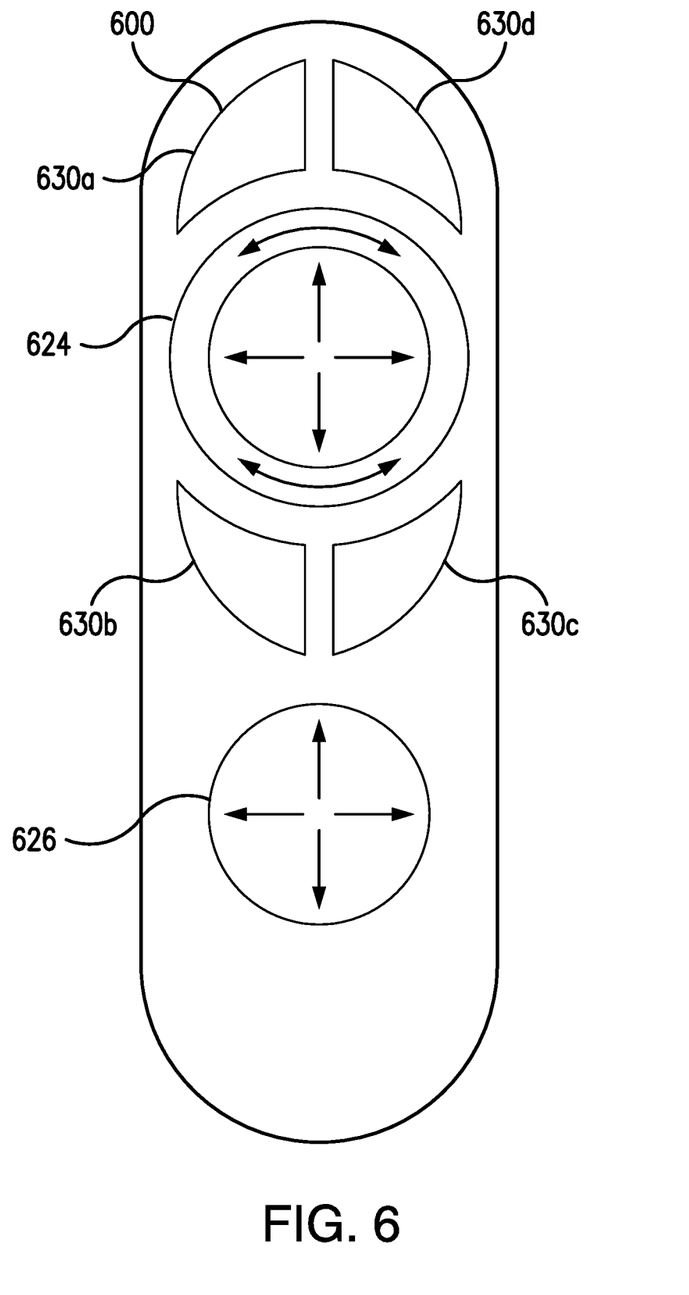

FIG. 6 depicts a controller 600 as a door panel controller (e.g., rotating knob selector or toggle selector), as discussed above with respect to FIGS. 1 and 2. The controller 600 may include one or more selectors such as rotating knob selector 624 and toggle selector 626. The controller 600 may provide similar functionality as the controller 520, discussed above with respect to FIG. 5. The rotating knob selector 624, for example, may provide similar functionality as the selector knob 522, and the additional selector buttons 630a-630d may provide similar functionality as the 530a-530d. The toggle selector 626 may provide an additional pivot and/or rotating knob input selection functionality to control an additional function than rotating knob selector 624. In at least one embodiment, the controller 600 may provide mirror (i.e., rear view, side view, etc.) adjustment functionality via the rotating knob selector 624, as well as control of one or more additional features (e.g., a trailering mirror, and the like).

Figure 7:
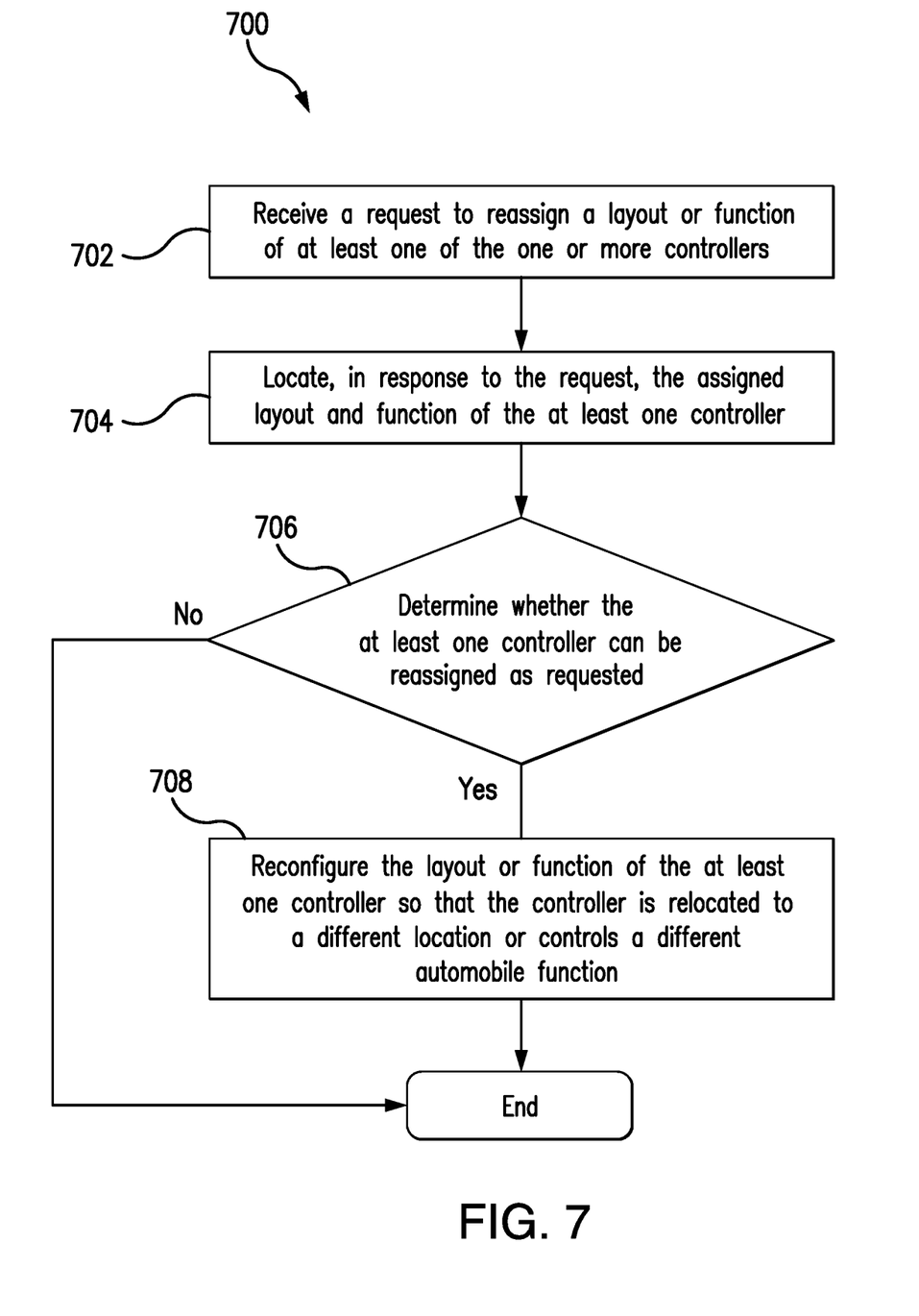
FIG. 7 is a flowchart of an example of a method of operating a configurable multi-purpose input control system according to an embodiment.

FIG. 7 shows a method 700 of configuring input controls of an automobile input control system such as, for example, the system 200 (FIG. 2) and/or the input controllers discussed with respect to FIGS. 3A-6. The method 700 may be implemented in logic instructions (e.g., software), configurable logic, fixed-functionality hardware logic, etc., or any combination thereof. Illustrated processing block 702 receives a request to reassign a layout and/or function of at least one of one or more controllers. At processing block 704, the system looks up the assigned layout and function of the at least one controller. At processing block 706, the system determines whether the at least one controller can be reassigned as requested. In making this determination, the system may analyze the capabilities and requirements of controllers based on information stored in the input controller subsystem 206 (e.g., controller type, control features, number of signal capabilities, compatibility, and the like). The system may determine, for example, that the reassignment of a function from one controller to another controller having suitable/compatible features may be permissible. On the other hand, the reassignment of a function from a controller to another controller not having suitable/compatible features may not permissible. If "Yes" at processing block 706, the system may reconfigure the layout or function of the at least one controller to be relocated to a different location or to control a different automobile function. Upon reconfiguring the layout or function, the method ends. If "No" at processing block 706, the process ends. The illustrated method 700 may thereby allow the layout and/or function of automobile input controllers to reassigned and reconfigured to improve driver access, comfort and safety.

The term and phrase "communication" and "in communication", respectively, may be used herein to refer to any type of relationship, direct or indirect, between the systems, subsystems, and components in question, and may apply to electrical, mechanical, fluid, optical, electromagnetic, electromechanical or other connections. In addition, the terms "system" and "subsystem" may be used interchangeably herein and may not be rigidly defined schematically unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

I claim:

1. A configurable input control system for an automobile, comprising:
   a processor;
   one or more controllers to provide an input control signal for a function of an automobile, wherein each of the one or more controllers are to be situated at different locations; and
   an input controller subsystem, in communication with the processor and the one or more controllers, to:
      receive a request to reassign a layout or function of at least one of the one or more controllers, wherein the request includes at least one of a new location or a new function for the at least one of the one or more controllers;
      locate, in response to the request, the assigned layout and function of the at least one of the one or more controllers;
      determine whether the at least one of the one or more controllers can be reassigned as requested; and
      reconfigure the layout or function of the at least one of the one or more controllers so that the at least one of the one or more controllers is electronically relocated to a different location or controls a different automobile function, wherein the one or more controllers include a turn signal switch, a wiper control switch, a rear view mirror control switch, a trailer mirror control switch, a cruise control switch, a mouse pad controller, a rotating knob selector, or a universal switch.

2. The system of claim 1, wherein reconfiguring the layout or function of the at least one of the one or more controllers includes modifying functions of one or more controllers provided on a steering column.

3. The system of claim 1, wherein reconfiguring the layout or function of the at least one of the one or more controllers includes changing a function associated with the at least one of the one or more controllers from one side of the driver to the other side.

4. The system of claim 3, wherein changing the functions from one side of the driver to the other side includes changing a layout of the at least one of the one or more controllers between a right-hand dominant layout and a left-hand dominant layout.

5. The system of claim 3, wherein changing the functions from one side of the driver to the other side is to change a layout of the at least one of the one or more controllers between a right-side drive layout and a left-side drive layout.

6. The system of claim 1, further comprising a universal controller having a display and located on a shifter or a dash, wherein reconfiguring a layout or function of the at least one of the one or more controllers includes relocating a function associated with the at least one of the one or more controllers to be located on the universal controller.

7. A method of configuring input controls of an automobile comprising:
receiving, via an input controller subsystem, a request to reassign a layout or function of at least one of one or more controllers, wherein the request includes at least one of a new location or a new function for the at least one of the one or more controllers;
locating, via the input controller subsystem in response to the request, the assigned layout and function of the at least one of the one or more controllers;
determining, via the input controller subsystem, whether the at least one of one or more controllers can be reassigned as requested; and
reconfiguring, via the input controller subsystem, the layout or function of the at least one of the one or more controllers so that the at least one of the one or more controllers is electronically relocated to a different location or controls a different automobile function, wherein the one or more controllers include a turn signal switch, a wiper control switch, a rear view mirror control switch, a trailer mirror control switch, a cruise control switch, a mouse pad controller, a rotating knob selector, or a universal switch.

8. The method of claim 7, wherein reconfiguring the layout or function of the at least one of the one or more controllers includes modifying functions of one or more controllers provided on a steering column.

9. The method of claim 7, wherein reconfiguring the layout or function of the at least one of the one or more controllers includes changing a function associated with the at least one of the one or more controllers from one side of the driver to the other side.

10. The method of claim 7, wherein changing the functions from one side of the driver to the other side includes changing a layout of the at least one of the one or more controllers between a right-hand dominant layout and a left-hand dominant layout.

11. The method of claim 9, wherein changing the functions from one side of the driver to the other side is to change a layout of the at least one of the one or more controllers between a right-side drive layout and a left-side drive layout.

12. The method of claim 7, further comprising a universal controller having a display and located on a shifter or dash, wherein reconfiguring a layout or function of the at least one of the one or more controllers includes relocating a function associated with the at least one of the one or more controllers to be located on the universal controller.

13. At least one computer readable storage medium comprising a set of instructions, when executed by a processor, cause the processor to:
receive a request to reassign a layout or function of at least one of the one or more controllers, wherein the request includes at least one of a new location or a new function for the at least one of the one or more controllers;
locate, in response to the request, the assigned layout and function of the at least one of the one or more controllers;
determine whether the at least one of the one or more controllers can be reassigned as requested; and
reconfigure the layout or function of the at least one of the one or more controllers so that the at least one of the one or more controllers is electronically relocated to a different location or controls a different automobile function, wherein the one or more controllers include a turn signal switch, a wiper control switch, a rear view mirror control switch, a trailer mirror control switch, a cruise control switch, a mouse pad controller, a rotating knob selector, or a universal switch.

14. The at least one computer readable storage medium of claim 13, wherein reconfiguring the layout or function of the at least one of the one or more controllers includes modifying functions of one or more controllers provided on a steering column.

15. The at least one computer readable storage medium of claim 13, wherein reconfiguring the layout or function of the at least one of the one or more controllers includes changing a function associated with the at least one of the one or more controllers from one side of the driver to the other side.

16. The at least one computer readable storage medium of claim 15, wherein changing the functions from one side of the driver to the other side is to change a layout of the at least one of the one or more controllers between a right-hand dominant layout and a left-hand dominant layout, or between a right-side drive layout and a left-side drive layout.

17. The at least one computer readable storage medium of claim 13, further comprising a universal controller having a display and located on a shifter or dash, wherein reconfiguring a layout or function of the at least one of the one or more controllers includes relocating a function associated with the at least one of the one or more controllers to be located on the universal controller.

* * * * *